Patented Aug. 31, 1937

UNITED STATES PATENT OFFICE 2,091,887

EMULSION AND PROCESS OF MANUFACTURING SAME

William F. Schanzle, Cincinnati, and Albert S. Richardson, Wyoming, Ohio, assignors to The Procter & Gamble Company, Cincinnati, Ohio, a corporation of Ohio No Drawing. Application August 7, 1929, Serial No. 384,241

13 Claims. (Cl. 167—90)

Our invention has particular reference to cosmetic creams of plastic texture of the common type comprising mixtures of water with various oils, fats and waxes.

Mono- and diglycerides of the higher fatty acids are among the materials already known to promote emulsification or mixing of oil and water, but have heretofore been little used, probably because of insufficient stability of the emulsions so obtained. We have found that the stability of such mixtures can be greatly increased, especially in the case of mixtures exposed to varying temperatures, by using a surprisingly small amount of soap in conjunction with a larger proportion of mono- and diglycerides. The mono- and diglycerides should preferably be solid or semi-solid, for instance, those derived from commercial stearic acid or from the fatty acids of hydrogenated fats. The term "hydrogenated fat" as used in the specification and claims is intended to designate any hydrogenated fat or fatty oil.

In connection with the invention disclosed herein, reference is made to our copending application, Serial No. 384,240, filed Aug. 7, 1929, in which a disclosure is made of a preferred manner of making an emulsifying agent having valuable stabilizing properties.

Preferably we use sodium soap, which is cheap and readily available, but we can use potassium soap or other soaps possessing some measure of water solubility at least when hot. The optimum amount of soap is not sharply defined, but the most desirable range is roughly ½% to 10% of the combined weight of mono- and diglyceride, which for convenience may collectively be called superglycerinated fat.

Excellent cosmetic creams can be prepared with the use of less than 10% superglycerinated fat and less than .1% soap in the total mixture. The stabilizing action of so small an amount of soap as a supplement to superglycerinated fat is considerably greater than would be predicted by prior knowledge of the stabilizing effect of soap on mixtures of oil and water without superglycerinated fat.

Cosmetic creams essentially similar to those which we have already described may be obtained by substituting for the superglycerinated fat analogous hydroxy esters of other polyhydric alcohols. On account of its availability at the present time, we refer particularly to the esters of glycol, such as glycol monostearate.

In other words, the esters suitable for use in our invention have as their common element of structure unesterified hydroxyl groups, the proportion of combined fatty acid in such esters being insufficient to esterify all the hydroxyl groups of the combined polyhydric alcohol.

In our use of the term "superglycerinated fat" in this specification and the claims which follow, we refer to fat mixtures having a preponderant proportion of mono- and/or diglycerides as contrasted with and distinguished from the ordinary fat having a preponderance of triglycerides, or to triglycerides having glycerin added thereto as, for example, in accordance with the following equation:

$$2C_3H_5(OH)_3 + C_3H_5(O-CO-R)_3 = 3C_3H_5(OH)_2O-CO-R$$

wherein R represents an alkyl radical contained in a fatty acid of high molecular weight.

In creams containing more oil than water, the amount of soap and hydroxy ester to prevent water separation may be insufficient to prevent entirely oil separation or insufficient to produce the desired degree of plasticity. On this account, or for the purpose of obtaining some minor modification of texture, it is sometimes desirable to incorporate in our creams additional solid materials, for instance, one of the waxes commonly used heretofore in cosmetic creams, such as beeswax or spermaceti. The use of such additional solid materials comes within the scope of our invention, but does not constitute a distinctive part thereof. At best, the waxes commonly used heretofore in cosmetic creams are much less effective than our combination of soap and hydroxy esters for the purpose of stabilizing the incorporation of water.

Perfume, coloring matter, or medicating agent may be added to our cosmetics, the texture of which will ordinarily not be seriously affected whether such added material be present in one of the liquid phases or as finely divided solid.

Our cosmetic creams are most satisfactorily prepared at or above the temperature at which the ester becomes completely melted or soluble in the oil used. The various ingredients are mixed at this temperature and the mixture allowed to cool with or without continued stirring. Usually, the best result is obtained by stirring only to the temperature at which the ester undergoes incipient crystallization.

In the completely molten condition, our creams are essentially emulsions of the water-in-oil type. On cooling, the phases in part become inverted and there results a compound emulsion of no simple type. The hydroxy ester crystallizes in a manner complicated by the presence of the aqueous phase. Hence our cosmetic creams are highly complicated mixtures of solid and ordinarily two liquid phases which we are not able fully to describe in scientific terms, but which possesses the practical advantages already set forth.

In the extreme case, we can omit the oil phase entirely, merely emulsifying an aqueous phase in molten hydroxy ester of so high melting point that it completely solidifies on cooling. There results an intimate admixture of the solid with the aqueous phase, having a pleasing plastic texture. This product, since it contains no oil, would not ordinarily be classed as a cosmetic cream, but, as a composition of matter especially suited for use as a base for cosmetics, it constitutes a part of our invention.

While our cosmetics are especially suited for application to the human skin, they are serviceable for cleansing and polishing and thus beautifying other surfaces, such as the surfaces of furniture or metal fixtures, and hence we use the word "cosmetic" in its literal and broadest sense.

The following examples will serve clearly to illustrate our invention, but are not intended to restrict its scope.

1. 17 parts of mineral oil of medicinal grade, 6.65 parts of glycerin monostearate, and .35 part of sodium stearate are melted together and stirred with 76 parts of water at 80° C. The mixture is allowed to cool, the stirring being continued until the temperature has reached 50° C.

2. 27 parts of mineral oil, 10.5 parts of glycerin monostearate, and .5 part of commercially pure soap flakes are melted together and stirred with a solution of 13 parts of glycerin and 49 parts water as in Example #1.

3. 19.5 parts of glycerin monostearate and .5 part commercially pure soap flakes are melted together and stirred with 80 parts of water at 80° and cooled to 50° with stirring.

4. 19.5 parts of glycerin monostearate and .5 part of commercially pure soap flakes are melted together and stirred with 80 parts of glycerin and cooled to 50° with stirring.

5. 16 parts of cottonseed oil hydrogenated to 70 iodine value is melted with 7.6 parts monoglyceride and .4 part soap prepared from the same hydrogenated oil. This is stirred with 76 parts of water to the desired consistency.

6. 16 parts of cottonseed oil hydrogenated to 70 iodine value is melted with 7.9 parts glycerin monostearate and .1 part sodium stearate. This is stirred with 76 parts of water to the desired consistency.

7. 10.5 parts of glycerin distearate and .5 part sodium stearate are melted with 25 parts of mineral oil and emulsified with 65 parts of water.

8. 55 parts mineral oil, 11 parts bleached beeswax, 10.5 parts gylcerin monostearate, and .5 part sodium stearate are melted together and emulsified with 20 parts of water.

In the above examples, it should be understood that the term stearate refers to compounds prepared from commercial stearic acid or from other sources of mixed fatty acids of high palmitic and stearic content.

Having thus described our invention, what we claim as new and desire to secure by Letters Patent, is:

1. In the production of emulsions, the process which comprises emulsifying polyhydric alcohols partially esterified with fatty acids of high molecular weight, with water or with aqueous solutions of suitable substances in the presence of soap in a quantity sufficient to increase materially the stability of the emulsion, but not substantially exceeding 10 per cent based on the weight of the partially esterified polyhydric alcohol.

2. Process as claimed in claim 1 wherein the polyhydric alcohol partially esterified with fatty acid of high molecular weight is glycerin monostearate and the soap is commercially pure soap.

3. In the production of emulsions, the process which comprises emulsifying polyhydric alcohols partially esterified with a mixture of fatty acids consisting predominantly of saturated fatty acids of high molecular weight, with water or with aqueous solutions of suitable substances in the presence of a water-soluble soap in a quantity sufficient to increase materially the stability of the emulsion, but not substantially exceeding ten per cent based on the weight of the partially esterified polyhydric alcohol.

4. In the production of emulsions the process which comprises emulsifying superglycerinated fat with water or with aqueous solutions of suitable substances in the presence of a water-soluble soap in a quantity sufficient to increase materially the stability of the emulsion but not substantially exceeding ten per cent based on the weight of the superglycerinated fat.

5. The process claimed in claim 4 wherein the superglycerinated fat is derived from a fat which is solid at ordinary room temperature.

6. The process claimed in claim 4 wherein the superglycerinated fat is derived from commercial stearic acid.

7. The process claimed in claim 4 wherein the superglycerinated fat is derived from hydrogenated fat.

8. The process claimed in claim 4 wherein the superglycerinated fat and soap are derived from hydrogenated cottonseed oil.

9. A composition of matter, especially suited for use as a base for cosmetics, comprising an aqueous phase plasticized by the intimate admixture of both a water-soluble soap and a solid ester of a polyhydric alcohol which is combined with high molecular fatty acid in such proportion as to leave some of the hydroxyl groups unesterified, the amount of said soap being not substantially greater than ten per cent based on the weight of said ester.

10. A composition of matter, especially suited for use as a base for cosmetics, comprising a liquid phase miscible with water but not completely miscible with oil, plasticized by the intimate admixture of both a water-soluble soap and a solid ester of a polyhydric alcohol which is combined with high molecular fatty acid in such proportion as to leave some of the hydroxyl groups unesterified, the amount of said soap being not substantially greater than ten per cent based on the weight of said ester.

11. An emulsion comprising polyhydric alcohol partially esterified with fatty acid of high molecular weight, water or aqueous solutions of suitable substances, and a water-soluble soap in a quantity not substantially exceeding ten per cent based on the weight of the partially esterified polyhydric alcohol.

12. An emulsion as claimed in claim 11 in which the partially esterified polyhydric alcohol is glycerin monostearate.

13. An emulsion as claimed in claim 11 in which the partially esterified polyhydric alcohol is glycerin monostearate and the soap is sodium stearate.

WILLIAM F. SCHANZLE.
ALBERT S. RICHARDSON.